United States Patent
Sasaki et al.

(10) Patent No.: US 10,608,242 B2
(45) Date of Patent: *Mar. 31, 2020

(54) LEAD-ACID BATTERY

(71) Applicant: GS Yuasa International Ltd., Kyoto-shi, Kyoto (JP)

(72) Inventors: Eriko Sasaki, Kyoto (JP); Ikumi Motoi, Kyoto (JP)

(73) Assignee: GS Yuasa International Ltd., Kyoto (JP)

(*) Notice: Subject to any disclaimer, the term of this patent is extended or adjusted under 35 U.S.C. 154(b) by 120 days.

This patent is subject to a terminal disclaimer.

(21) Appl. No.: 15/562,762

(22) PCT Filed: Mar. 28, 2016

(86) PCT No.: PCT/JP2016/001795
§ 371 (c)(1),
(2) Date: Sep. 28, 2017

(87) PCT Pub. No.: WO2016/157884
PCT Pub. Date: Oct. 6, 2016

(65) Prior Publication Data
US 2018/0083267 A1    Mar. 22, 2018

(30) Foreign Application Priority Data

Mar. 30, 2015 (JP) ................ 2015-069581

(51) Int. Cl.
*H01M 4/14* (2006.01)
*H01M 4/62* (2006.01)
(Continued)

(52) U.S. Cl.
CPC ............. *H01M 4/14* (2013.01); *H01M 2/364* (2013.01); *H01M 4/16* (2013.01); *H01M 4/62* (2013.01);
(Continued)

(58) Field of Classification Search
CPC .......... H01M 4/14; H01M 4/62; H01M 4/627; H01M 10/06
See application file for complete search history.

(56) References Cited

U.S. PATENT DOCUMENTS

| 4,130,695 A | 12/1978 | Dietz |
| 6,074,782 A | 6/2000 | Mizutani |
| 6,346,347 B1 * | 2/2002 | McNally ............... H01M 4/627 29/623.5 |

FOREIGN PATENT DOCUMENTS

| JP | 06251766 A * | 9/1994 |
| JP | 3385879 | 3/2003 |

(Continued)

OTHER PUBLICATIONS

PubChem, https://pubchem.ncbi.nlnn.nih.gov/compound/25113471#section=Top, accessed Jan. 14, 2019 (Year: 2019).*
(Continued)

*Primary Examiner* — Jonathan G Jelsma
(74) *Attorney, Agent, or Firm* — Rankin, Hill & Clark LLP

(57) ABSTRACT

A lead-acid battery includes a negative electrode plate that comprises: a negative electrode material which has a density of 2.7 g/cm$^3$ or more and 3.8 g/cm$^3$ or less and contains an organic expander having an S element content of 3900 μmol/g or more; and a current collector.

10 Claims, 8 Drawing Sheets

(51) Int. Cl.
*H01M 2/36* (2006.01)
*H01M 4/16* (2006.01)
*H01M 8/08* (2016.01)
*H01M 8/1041* (2016.01)

(52) U.S. Cl.
CPC ............. *H01M 4/627* (2013.01); *H01M 8/08* (2013.01); *H01M 8/1055* (2013.01)

(56) References Cited

FOREIGN PATENT DOCUMENTS

| | | | |
|---|---|---|---|
| JP | 2003142085 A2 | | 5/2003 |
| JP | 2006049025 A | * | 2/2006 |
| JP | 2006196191 A2 | | 7/2006 |
| JP | 2007273367 A2 | | 10/2007 |
| JP | 2008152955 A1 | | 7/2008 |
| JP | 201341848 | | 2/2013 |
| JP | 2014123525 A2 | | 7/2014 |
| JP | 2015088379 A2 | | 5/2015 |
| JP | 2015128053 A | * | 7/2015 |
| WO | 2012017702 A1 | | 2/2012 |

OTHER PUBLICATIONS

International Search Report dated May 10, 2016 filed in PCT/JP2016/001795.
Extended European Search Report (EESR) dated Jul. 11, 2018 issued in the corresponding European patent application No. 16771772.7.

* cited by examiner

LEAD-ACID BATTERY

TECHNICAL FIELD

The present invention relates to a lead-acid battery.

BACKGROUND ART

An organic expander such as lignosulfonic acid or bisphenols condensate is added to a negative electrode material of the lead-acid battery. The organic expander prevents shrink of the negative electrode material, temporarily traps $Pb^{2+}$ ions during charge-discharge, and further improves low-temperature high rate discharge performance.

With respect to the organic expander, Patent Document 1 (JP 3385879 B1) describes that when 90% or more of lignosulfonic acid is sulfonated, variations of the low temperature high rate discharge performance can be reduced. Patent Document 2 (JP-A-2013-41848) describes that when bisphenols condensate having an S element content of 6 to 10 mass % is used in place of the lignosulfonic acid, the charge acceptance performance is improved.

Aside from this, Patent Document 3 (JP-A-2003-142085) describes that when much graphite or carbon is added, a density of the negative active material is set to 2.5 to 3.8 g/cm$^3$, and a battery is formed with an electrolyte solution containing at least one selected from among Sb, Sn, Bi, Zn, Se, Mn, Ca, Mg, and Sr, a lead-acid battery which bears up under high-temperature and has excellent high rate performance is obtained.

PRIOR ART DOCUMENTS

Patent Documents

Patent Document 1: JP 3385879 B1
Patent Document 2: JP-A-2013-41848
Patent Document 3: JP-A-2003-142085

SUMMARY OF THE INVENTION

Problems to be Solved by the Invention

Heretofore, there has been a requirement of reducing a lead amount in the active material for a cost reduction. However, when an active material density is reduced in order to reduce a lead amount in the active material, an accumulation amount of lead sulfate is increased since charge acceptance performance is deteriorated. Therefore, the active material density cannot be lowered. Further, it is known that as countermeasures against the above situation, a large amount of carbon is added, but there is a problem that a capacity becomes insufficient as an amount of lead constituting an electrode is decreased. Therefore, a battery having the large amount of carbon added is not suitable for a practical use.

It has not been understood that this problem can be solved by the S element content in the organic expander, and it is found out for the first time that by setting the S element content in the organic expander to 3900 µmol/g or more, it is possible to attain the charge acceptance performance to withstand practical use without adding a large amount of carbon even when the density of the negative active material usually set to around 4.4 g/cm$^3$ is lowered to 2.7 to 3.8 g/cm$^3$.

Conventionally, there is the effect of improving the charge acceptance according to a carbon amount by increasing the carbon amount when the density of the negative active material is decreased in the case of the S element concentration of 600 µmol/g. However, when the carbon having the amount by which the charge acceptance is significantly improved is added, a negative effect of reducing the discharge duration time at 0.2 CA is produced, and therefore the density of the negative active material cannot be lowered.

This time, since an improvement of the charge acceptance performance is achieved by changing the S element content in the organic expander to 3900 µmol/g or more, the necessity to add a large amount of carbon is eliminated. It is a very large achievement that it becomes possible to improve the charge acceptance without adding a large amount of carbon.

Moreover, since the present inventors also succeeded in improving the discharge duration time at 0.2 CA, it has become possible to attain the discharge duration time at 0.2 CA equal to or larger than a conventional one even when lowering the density of the negative active material. In addition to achievement of an improvement of the discharge duration time at 0.2 CA, this enables to select a constitution which reduces the effect of addition of a large amount of carbon on a reduction of the discharge duration time at 0.2 CA.

Even when the density of the negative active material is low, it is adapted to be able to maintain the discharge duration time at 0.2 CA. This has accomplished to deliver a capacity even though reducing a lead amount in the active material, which cannot be previously achieved. It is a very large achievement that it becomes possible to use a negative active material having a low density which has not been practical.

An object of the present invention is to improve the charge acceptance performance.

Means for Solving the Problems

One aspect of the present invention is a lead-acid battery comprising a negative electrode material, which has a density of 2.7 g/cm$^3$ or more and 3.8 g/cm$^3$ or less and contains an organic expander. The organic expander has a sulfur element (S element) content of 3900 µmol/g or more. Thereby, charge acceptance performance is improved.

Another aspect of the present invention is a lead-acid battery, wherein a negative electrode plate taken out from the lead-acid battery is washed with water to eliminate a sulfuric acid content, a negative electrode material is separated from the negative electrode plate whose sulfuric acid content is removed, the negative electrode material is immersed in a 1 mol/L sodium hydroxide aqueous solution, a solution obtained by removing, by filtration, a component which is insoluble in the aqueous solution is desalted, condensed, and dried to obtain a powder specimen and the S element content of the powder specimen is 3900 µmol/g or more, and the negative electrode material has a density of 2.7 g/cm$^3$ or more and 3.8 g/cm$^3$ or less. Thereby, charge acceptance performance is improved.

Another aspect of the present invention is a method for manufacturing a lead-acid battery, wherein a negative electrode is prepared so that the negative electrode includes a negative electrode material, which has a density of 2.7 g/cm$^3$ or more and 3.8 g/cm$^3$ or less and contains an organic expander. The organic expander has a sulfur element (S element) content of 3900 µmol/g or more. Thereby, charge acceptance performance is improved.

Each of these aspects constitutes each invention, and it is not necessary to satisfy all of these features.

MODE FOR CARRYING OUT THE INVENTION

Figure 1:
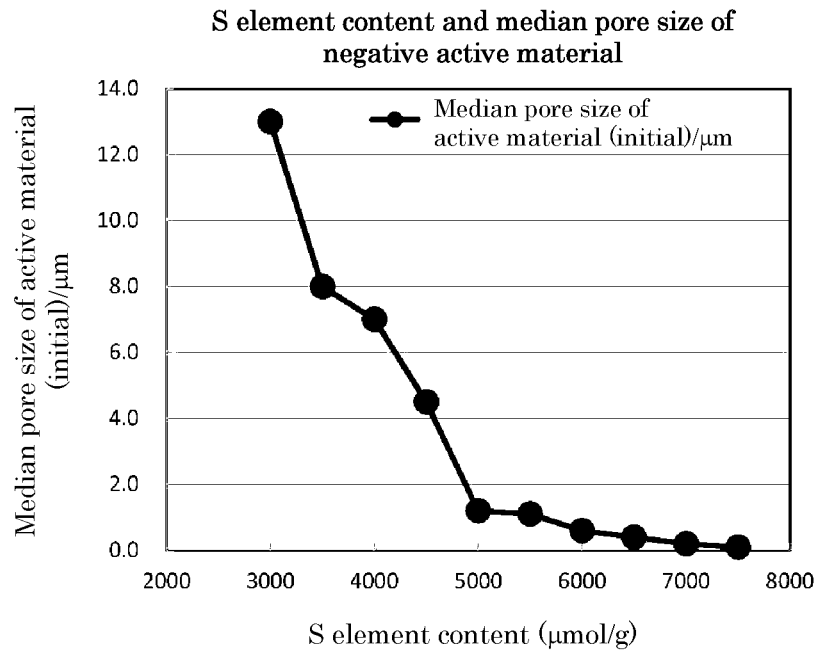
FIG. 1 is a characteristic graph showing a relation between an S element content in an organic expander and a median pore size of a negative electrode material.
Figure 2:
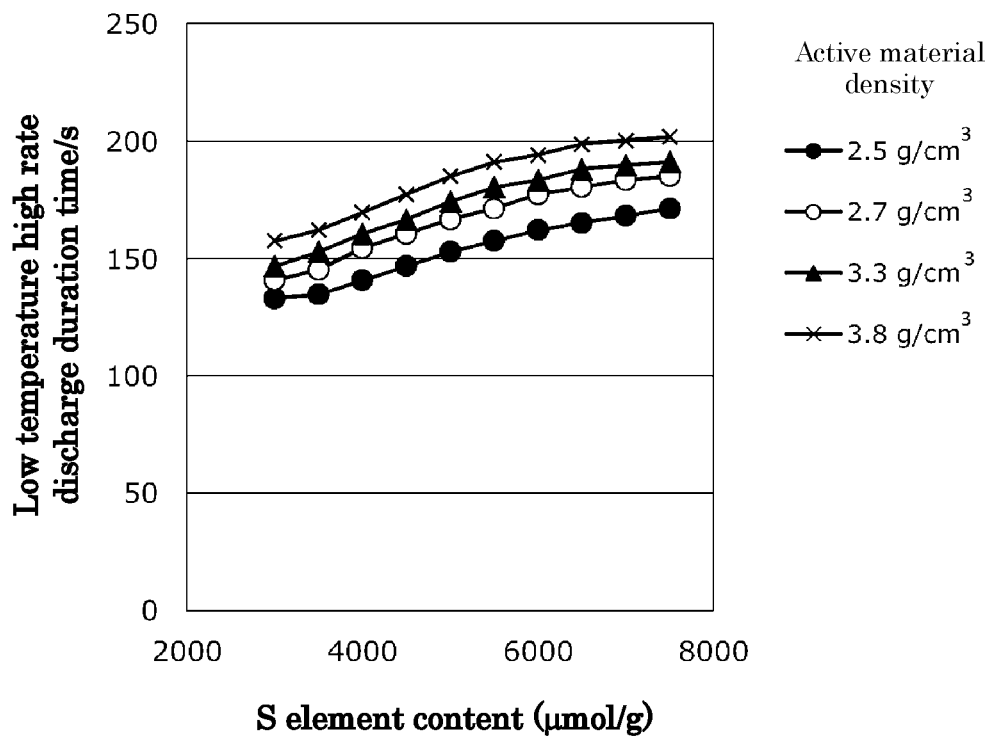
FIG. 2 is a characteristic graph showing a relation between the S element content in the organic expander and a low temperature high rate discharge duration time.

One of inventors has made investigations concerning performance of a storage battery in increasing an S element concentration in the organic expander. As a result of this, it turned out that the higher the S element concentration is, the smaller a colloid particle size of the organic expander becomes, and simultaneously the smaller a pore size of the negative active material becomes. Furthermore, it was found that when the S element concentration is high, the specific resistance of the negative electrode material is reduced and the low temperature high rate discharge performance is improved. The present inventor further searched combinations of the S element concentration in the organic expander and the density of the negative electrode material, and found that in specific ranges, the low temperature high rate discharge performance, the low rate discharge capacity and the charge acceptance performance can be improved, and accumulation of lead sulfate on a lower portion of the negative electrode plate can be suppressed.

One aspect of the present invention is a lead-acid battery comprising a negative electrode material, which has a density of 2.7 $g/cm^3$ or more and 3.8 $g/cm^3$ or less and contains an organic expander, and the organic expander has a sulfur element (S element) content of 3900 μmol/g or more. Thereby, charge acceptance performance is improved.

One aspect of the present invention is a lead-acid battery, wherein a negative electrode plate taken out from the lead-acid battery is washed with water to eliminate a sulfuric acid content, a negative electrode material is separated from the negative electrode plate whose sulfuric acid content is removed, the negative electrode material is immersed in a 1 mol/L sodium hydroxide aqueous solution, a solution obtained by removing, by filtration, a component which is insoluble in the aqueous solution is desalted, condensed, and dried to obtain a powder specimen and the S element content of the powder specimen is 3900 μmol/g or more, and the negative electrode material has a density of 2.7 $g/cm^3$ or more and 3.8 $g/cm^3$ or less. Thereby, charge acceptance performance is improved.

One aspect of the present invention is a method for manufacturing a lead-acid battery, wherein a negative electrode is prepared so that the negative electrode includes a negative electrode material, which has a density of 2.7 $g/cm^3$ or more and 3.8 $g/cm^3$ or less and contains an organic expander, and the organic expander has a sulfur element (S element) content of 3900 μmol/g or more. Thereby, charge acceptance performance is improved.

Herein, an S element content of the organic expander may be 3900 μmol/g or more and 6000 μmol/g or less. According to this one aspect, it is preferred since a low rate discharge capacity can be maintained favorable.

Herein, the S element content of the organic expander may be 4300 μmol/g or more. According to this one aspect, it is preferred since the effect of improving the charge acceptance performance is particularly large.

Herein, the S element content of the organic expander may be 4300 μmol/g or more and 6000 μmol/g or less. According to this one aspect, it is preferred since the effect of improving the charge acceptance performance is particularly large and discharge duration performance at 0.2 CA can be increased.

Herein, the organic expander may be a synthetic polymer. According to this one aspect, it is preferred since the S element content can be easily set to 3900 μmol/g or more.

Herein, the organic expander may be bisphenols condensate. According to this one aspect, it is preferred since starting performance at low temperature is not impaired even when undergoing a high-temperature environment and therefore the lead-acid battery is suitable for a flooded-type lead-acid battery for an automobile or the like.

Herein, the S element content of the organic expander may be a total amount of a sulfonic acid group and a sulfonyl group. According to this one aspect, it is preferred since it is possible to suppress the growth of organic expander particles.

One aspect of the present invention includes a negative electrode plate that comprises: a negative electrode material which has a density of 2.7 $g/cm^3$ or more and 3.8 $g/cm^3$ or less and contains an organic expander having an S element content of 3900 µmol/g or more; and a current collector.

Herein, the negative electrode plate for a lead-acid battery comprises a negative electrode material and a current collector, and the negative electrode material contains an organic expander having an S element content of 3900 µmol/g or more and 6000 µmol/g or less and has a density of 2.7 g/cm$^3$ or more and 3.8 g/cm$^3$ or less. Incidentally, in the present specification, descriptions on the lead-acid battery are applicable to the negative electrode plate as-is.

Herein, by setting the S element content of the organic expander to 3900 µmol/g or more, and setting the density of the negative electrode material to 2.7 g/cm$^3$ or more, the low temperature high rate discharge performance is improved. Further, by setting the density of the negative electrode material to 2.7 g/cm$^3$ or more, the charge acceptance performance is improved. However, when the density is more than 3.8 g/cm$^3$, it becomes difficult to fill a negative active material paste into the current collector, and therefore the density is preferably 2.7 g/cm$^3$ or more and 3.8 g/cm$^3$ or less.

When the density of the negative electrode material is 2.7 g/cm$^3$ or more and 3.8 g/cm$^3$ or less, the charge acceptance performance is particularly improved and the lead sulfate accumulation amount on a lower portion of the negative electrode plate is reduced between the S element content of 3900 µmol/g and the S element content of 4500 µmol/g. Further, when the S element content is more than 6000 µmol/g, the low rate discharge capacity is lowered. Therefore, the S element content of the organic expander is preferably 3900 µmol/g or more and 6000 µmol/g or less, and more preferably 4300 µmol/g or more and 6000 µmol/g or less. The S element content of the organic expander is set to most preferably 4500 µmol/g or more and 6000 µmol/g or less.

When the sulfonic acid group is introduced in a phenyl group of a lignin, it is difficult to introduce one or more sulfonic acid groups per one phenyl group, and therefore it is also difficult to set the S element content to 3900 µmol/g or more. However, if an alkyl group or the like is put in a medium, and the sulfonic acid group or the sulfonyl group is introduced in the phenyl group or a propyl group of the lignin without directly introducing the sulfonic acid group or the sulfonyl group in the phenyl group, the S element content of the lignin can be set to 3900 µmol/g or more. Accordingly, an organic expander obtained by introducing the sulfonic acid group or the sulfonyl group in the lignin, may be used.

When the sulfonic acid group or the sulfonyl group is introduced in bisphenols condensate, naphthalene condensate or the like other than lignin, the S element content can be easily set to 3900 µmol/g or more. Accordingly, the organic expander is preferably the synthetic polymer. Incidentally, since bisphenol S contains the sulfonyl group, the S element content of the bisphenol S can be elevated. Further, formaldehyde condensate of β-naphthalenesulfonic acid is available as a trade name "DEMOL" manufactured by Kao Corporation.

Among the synthetic polymers, bisphenols condensate is preferred as an expander. In the bisphenols condensate, since starting performance at low temperature is not impaired even when undergoing a high-temperature environment, the bisphenols condensate is suitable for a flooded-type lead-acid battery for an automobile or the like. Incidentally, since polarization a lead-acid battery hardly becomes small when using condensate of naphthalenesulfonic acid compared with condensate of bisphenols, condensate of naphthalenesulfonic acid is suitable for a valve regulated lead-acid battery in which characteristics of electrolyte solution decrease is important.

It can be assumed that a stable form of the S element in a synthetic polymer expander is a sulfonyl group or a sulfonic acid group, and the S element content in the synthetic polymer expander is a total amount of the sulfonic acid group and the sulfonyl group.

Findings related to the present invention will be described. When the S element content in the organic expander is increased, the colloid particle size of the organic expander particle in sulfuric acid is decreased, and the median pore size of the negative electrode material is also decreased. This indicates that a pore size of the negative electrode material is determined by the colloid particle size of the organic expander dispersed in the negative electrode material. Furthermore, when the S element content in the organic expander is increased, the specific resistance of the negative electrode material is also decreased.

The content of the organic expander is preferably 0.05 mass % or more and 0.3 mass % or less in terms of a concentration by mass % in the negative electrode material. When the S element in the organic expander exists as the sulfonic acid group or the sulfonyl group ($SO^2$ group), a hydrophilic property and surface charging of the organic expander are enhanced due to strong charge of the sulfonic acid group or strong polarization of the sulfonyl group to suppress the growth of organic expander particles. The result in the case where the S element exists as the sulfonic acid group is nearly equal to that in the case where the S element exists as the sulfonyl group.

To the negative electrode material of the lead-acid battery, an inorganic substance such as carbon or barium sulfate, and an organic expander such as lignosulfonic acid or bisphenols condensate may be added. Both of the inorganic substance and the organic substance to be respectively added are collectively referred to as a shrink-proofing agent (expander), and the expander derived from the organic substance is particularly referred to as an organic expander.

Incidentally, bisphenols condensate may contain bisphenol A as a skeleton, or may contain bisphenol F, S or the like as a skeleton. Alternatively, a mixture thereof may be used as a skeleton.

Measurement Method

The S element content of the organic expander (hereinafter, referred to as merely "S element content") in the negative active material is measured in the following manner. A fully charged lead-acid battery is disassembled, a negative electrode plate is taken out, a sulfuric acid content is removed by water-washing, and a weight of dried negative electrode plate is measured. An active material is separated from the negative electrode plate and immersed in a 1 mol/L sodium hydroxide aqueous solution to extract an organic expander, and qualitative analysis of a type of the organic expander is performed with ultraviolet-visible absorption spectrum or the like. When qualification of the type is incomplete only by absorption spectrum, GC-MS, NMR or the like may be used together. Further, the content of the organic expander is measured using absorbance at an absorption wavelength for each of the types of the organic expanders, and a calibration curve. Further, a sodium hydroxide aqueous solution of the organic expander obtained by being extracted from the active material is desalted with use of a column or a dialysis tube, condensed, and dried. An S element in 0.1 g of the organic expander is converted to sulfuric acid by an oxygen flask combustion method, and the S element content in the organic expander is determined by titrating an elution solution with barium perchlorate using thorin as an indicator.

When a concentration of an aqueous solution of barium perchlorate is denoted by C (umol $L^{-1}$), and a titer is denoted by V (L), the S element content Ws (umol g-1) is represented by Ws=CV/0.1.

With respect to a density of the negative active material (negative electrode material), a lead-acid battery formed and fully charged is disassembled, a negative electrode plate is taken out, a sulfuric acid content is removed by water-washing, the negative electrode plate is dried, an active material is taken out from the negative electrode plate, and an apparent volume v per 1 g and a whole pore volume u per 1 g of the active material are measured by a mercury intrusion technique with the active material unpulverized.

The apparent volume v is a sum of a solid volume of the negative active material and a volume of closed pores. The negative active material is filled in a container with a known volume V1, and a pore volume V2 corresponding a pore size of 100 μm or more is measured by the mercury intrusion technique. Keeping on intruding mercury, the whole pore volume u is measured, (V1−V2)−u is considered as the apparent volume v, and a density d of the negative active material is determined from an equation d=1/(v+u)=1/(V1−V2).

An optimal example of the present invention will be described below. In embodying the present invention, the example can be appropriately modified according to common sense of those skilled in the art and disclosure of the prior art. It is assumed that the plate is composed of a current collector such as a grid and an electrode material supported by the current collector, and the electrode material includes materials not involved in an electrochemical reaction such as bisphenols condensate, carbon black, barium sulfate and synthetic fiber reinforcements. The negative electrode material is a material predominantly composed of a spongy lead, and a positive electrode material is a material predominantly composed of lead dioxide. Incidentally, in the examples, the electrode material is referred to as an active material for simplicity. Further, the organic expander may be referred to as merely an expander. The organic expander means an additive which suppresses the shrinkage of the negative active material of the lead-acid battery without regard to a natural polymer or a synthetic polymer.

EXAMPLES

Preliminary Test

A formed negative electrode plate containing an organic expander composed of bisphenols condensate in an amount of 0.15 mass % with respect to a negative electrode material, was produced A pore size distribution on a volume basis was measured by the mercury intrusion technique, and the median pore size of the negative electrode material was determined by excluding pores having a pore size of 100 μm or more. Further, colloid particle sizes of the organic expander in sulfuric acid solution were measured by a laser light scattering method to determine a median value on a volume basis of the colloid particle size. The median pore size decreased with an increase of the S element content (FIG. 1), and the colloid particle size, but not shown in a drawing, also decreased with an increase of the S element content.

Next, it was confirmed that the S element in the organic expander may exist as the sulfonic acid group or may exist as the sulfonyl group. The S element content in the organic expander and the concentration of the organic expander were fixed to 5000 μmol/g and 0.15 mass %, respectively, and a ratio between the content of an S element derived from the sulfonyl group and the content of an S element derived from the sulfonic acid group was varied by varying a ratio between bisphenol A and bisphenol S. As shown in Table 1, an influence of varying ratio between the case of the sulfonyl group and the case of the sulfonic acid group, was small. Incidentally, the same results were obtained when the S element content was varied by varying a mixing ratio of bisphenols A, S and F, and performing condensation and sulfonation. Further, the same result was obtained when condensate of naphthalenesulfonic acid was used.

TABLE 1

| S Element Content/μmol/g | 5000 | | | |
|---|---|---|---|---|
| Organic Expander | Bisphenol | | | Naphthalene |
| Amount of S Derived from Sulfonyl Group/μmol/g | 700 | 1400 | 2100 | — |
| Amount of S Derived from Sulfonic Acid Group/μmol/g | 4300 | 3600 | 2900 | 5000 |
| Initial Low Temperature High Rate Discharge Duration Time/s | 186 | 185 | 189 | 188 |
| Discharge Duration Time at 0.2 CA/h | 6.5 | 6.5 | 6.5 | 6.5 |
| Colloid Particle Size (25° C.)/μm | 1.0 | 1.0 | 1.0 | 1.0 |

Furthermore, the effects of a concentration of the organic expander were investigated. The S element content of the organic expander was 5000 μmol/g. Of the S element content of 5000 μmol/g, the content of an S element derived from the sulfonyl group was 1400 μmol/g and the content of an S element derived from the sulfonic acid group was 3600 μmol/g. A concentration of the organic expander was varied in three stages of 0.10 mass %, 0.15 mass % and 0.20 mass %. The results of investigations are shown in Table 2. When the concentration of the organic expander was increased, the low temperature high rate discharge performance was improved, but the low rate discharge capacity was not changed. From this, a preferred range of the concentration of the organic expander was set to 0.05 mass % or more and 0.3 mass % or less.

TABLE 2

| S Element Content/μmol/g | 5000 | | |
|---|---|---|---|
| Amount of S Derived from Sulfonyl Group/μmol/g | 1400 | | |
| Amount of S Derived from Sulfonic Acid Group/μmol/g | 3600 | | |
| Content/mass % | 0.10 | 0.15 | 0.20 |
| Initial Low Temperature High Rate Discharge Duration Time/s | 182 | 185 | 188 |
| Discharge Duration Time at 0.2 CA/h | 6.5 | 6.5 | 6.5 |
| Colloid Particle Size (25° C.)/μm | 1.0 | 1.0 | 1.0 |

Experiment 1

Production of Lead-Acid Battery

A lead powder, an organic expander composed of bisphenols condensate, barium sulfate, carbon black, and synthetic fiber reinforcements were mixed using water and sulfuric acid to form a negative active material paste. The organic expander, the barium sulfate, the synthetic fiber reinforcements, and the carbon black were contained in amounts of 0.10 mass %, 1.0 mass %, 0.05 mass % and 0.2 mass %, respectively, with respect to the formed negative active material (strictly negative electrode material). With respect to ranges of preferred contents of these components, the organic expander is from 0.05 mass % to 0.3 mass % (inclusive), the barium sulfate is from 0.5 mass % to 2.0 mass % (inclusive), the synthetic fiber reinforcements is from 0.03 mass % to 0.2 mass % (inclusive), and carbon such as carbon black is 3.0 mass % or less. The negative active material paste was filled in an expanded grid made of a Pb—Ca—Sn alloy and subjected to drying and curing to form an unformed negative electrode plate.

In examples, as the organic expander are used condensate of bisphenol A having the sulfonic acid group introduced and formaldehyde and condensate of bisphenol S having the sulfonic acid group introduced and formaldehyde. Conditions of sulfonation were enhanced more than conventional conditions to make an increase in average value of the number of the sulfonic acid groups per a molecule of bisphenol from a conventional value. Further, a mixture of bisphenols A, F and S was condensed, and then sulfonated. Production conditions were thus adjusted so that the S element content in the formed organic expander falls within the range of 3000 μmol/g to 7500 μmol/g. Aside from this, lignosulfonic acid in which the S element content in the formed organic expander was 600 μmol/g was used as a comparative example. A type of a lead powder and production conditions were optional, and components other than the above-mentioned components may be contained.

A lead powder and synthetic fiber reinforcements (0.1 mass % with respect to the formed positive active material) were mixed using water and sulfuric acid to form a positive active material paste. The paste was filled in a Pb—Ca—Sn-based expanded grid and subjected to drying and curing to form an unformed positive electrode plate. The unformed negative electrode plate was enveloped with a microporous polyethylene separator, and set in a container together with the positive electrode plate, and an electrolyte solution containing sulfuric acid having specific gravity of 1.30 at 25° C. was added to perform container formation, and thereby, a lead-acid battery in which a current at 5 hour rate (0.2 CA) was 5.0 A at an output of 12 V, was formed.

Performance Test

The following initial performance was measured on batteries in which the S element content of the organic expander were varied.

Discharge duration time at 0.2 CA: A time that elapses before a terminal voltage is lowered to 10.5 V in discharging at a current value of 0.2 CA Low temperature high rate discharge duration time: A time that elapses before a terminal voltage is lowered to 6.0 V in discharging at 150 A in a thermostatic bath of −15° C.

Charge acceptance performance: A charge current after a lapse of ten minutes from the start of charge in charging at a constant voltage of 14.4 V at 0° C. after discharging at a current of 0.2 CA at 25° C. for 2.5 hours Specific Resistance: Specific resistance of the negative active material is measured by a four-terminal method As a life test, a light load life test described in JIS D 5301 (2006) was modified, and a cycle in which discharge is performed at a constant current of 25 A for 240 seconds and then charge is performed at 14.8 V and a maximum current of 25 A for 600 seconds, is repeated 800 times in a water bath of 40° C. After the test, a negative active material in an area up to 2 cm away from a lower end of the negative electrode plate was collected, and an accumulation amount of lead sulfate was measured. In this measurement, a collected negative active material is washed with water and dried first, and a sulfur (S) amount in the negative active material was measured using an S element analyzing apparatus. Thereafter, the S amount in lead sulfate was determined according the following equation.

$$S \text{ amount in lead sulfate} = (S \text{ amount obtained by } S \text{ element analyzing apparatus}) - (\text{Sample mass} \times \text{Content of organic expander} \times S \text{ element content in organic expander}).$$

The resulting S amount in the lead sulfate was converted to an amount of lead sulfate, and a concentration of the lead sulfate in a sample mass was determined and considered as an accumulation amount of lead sulfate.

Figure 3:
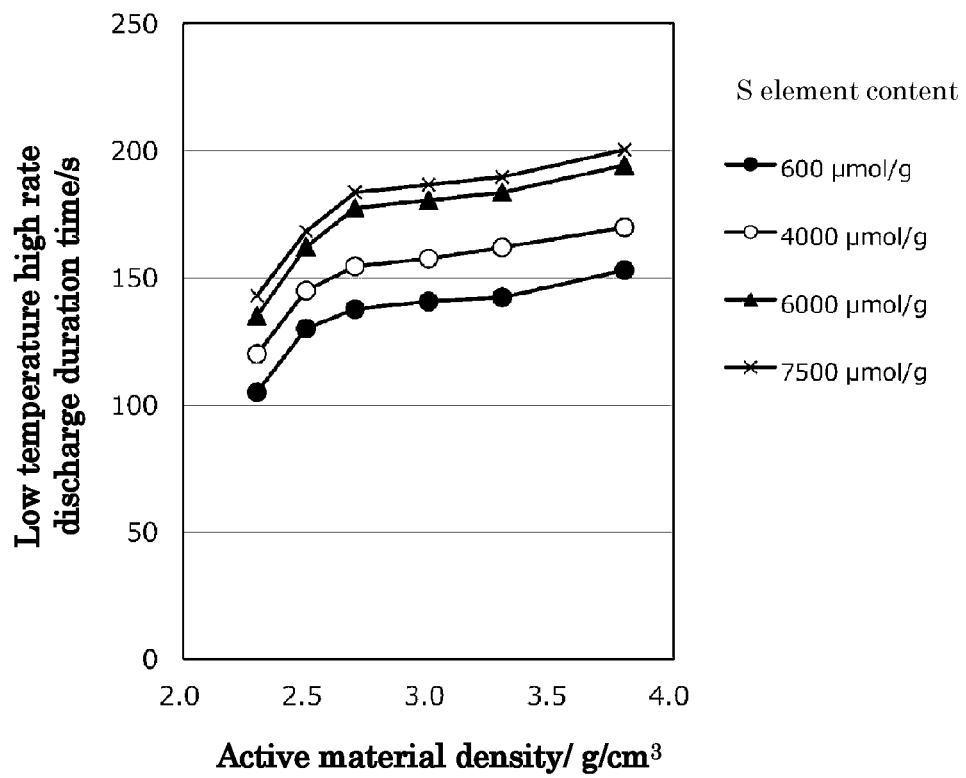
FIG. 3 is a characteristic graph showing a relation between a negative active material density and a low temperature high rate discharge duration time.

These test results are shown in Table 3 to Table 6, and main results are extracted in FIGS. 2 to 11. The low temperature high rate discharge performance was improved with an increase of the S element content in the organic expander (hereinafter, sometimes referred to as merely "S element content") (FIG. 2), and was improved with an increase of the density of the negative active material. Particularly, the high rate discharge performance was significantly increased between the density of 2.3 g/cm$^3$ and the density of 2.7 g/cm$^3$ (FIG. 3).

TABLE 3

S Element Content in Organic Expander and Initial Performance

| S Element Content (μmol/g) | 600* | 3000 | 3500 | 4000 | 4500 | 5000 | 5500 | 6000 | 6500 | 7000 | 7500 |
|---|---|---|---|---|---|---|---|---|---|---|---|
| Case of Active Material Density of 2.5 g/cm$^3$ | | | | | | | | | | | |
| Low Temperature High Rate Discharge Duration Time (s) | 130 | 133 | 135 | 141 | 147 | 153 | 158 | 162 | 165 | 168 | 171 |
| Discharge Duration Time at 0.2 CA (h) | 4.0 | 4.3 | 4.6 | 4.8 | 4.9 | 5.0 | 5.1 | 4.7 | 4.2 | 3.8 | 3.7 |
| Case of Active Material Density of 2.7 g/cm$^3$ | | | | | | | | | | | |
| Low Temperature High Rate Discharge Duration Time (s) | 138 | 141 | 145 | 155 | 161 | 167 | 171 | 177 | 181 | 184 | 185 |
| Discharge Duration Time at 0.2 CA (h) | 4.3 | 4.5 | 4.8 | 5.0 | 5.2 | 5.3 | 5.4 | 4.9 | 4.4 | 4.0 | 3.8 |
| Case of Active Material Density of 3.3 g/cm$^3$ | | | | | | | | | | | |
| Low Temperature High Rate Discharge Duration Time (s) | 142 | 147 | 153 | 161 | 167 | 174 | 181 | 184 | 188 | 190 | 191 |
| Discharge Duration Time at 0.2 CA (h) | 4.6 | 4.8 | 5.0 | 5.3 | 5.5 | 5.7 | 5.9 | 5.2 | 4.7 | 4.2 | 4.0 |
| Case of Active Material Density of 3.8 g/cm$^3$ | | | | | | | | | | | |
| Low Temperature High Rate Discharge Duration Time (s) | 153 | 158 | 162 | 170 | 177 | 185 | 191 | 194 | 199 | 200 | 202 |
| Discharge Duration Time at 0.2 CA (h) | 4.8 | 5.0 | 5.2 | 5.6 | 5.9 | 6.1 | 6.3 | 5.3 | 4.9 | 4.4 | 4.3 |

* The samples having an S element content of 600 μmol/g are samples of a comparative example in which an organic expander is made of lignosulfonic acid

TABLE 4

Density of Negative Active Material and Initial Performance

| Active Material Density (g/cm³) | 2.3 | 2.5 | 2.7 | 3.0 | 3.3 | 3.8 |
|---|---|---|---|---|---|---|
| Case of S Element Content of 600 μmol/g * | | | | | | |
| Low Temperature High Rate Discharge Duration Time (s) | 105 | 130 | 138 | 141 | 142 | 153 |
| Discharge Duration Tune at 0.2 CA (h) | 3.8 | 4.0 | 4.3 | 4.5 | 4.6 | 4.8 |
| Case of S Element Content of 4000 μmol/g * | | | | | | |
| Low Temperature High Rate Discharge Duration Time (s) | 120 | 145 | 155 | 158 | 162 | 170 |
| Discharge Duration Time at 0.2 CA (h) | 4.5 | 4.8 | 5.0 | 5.2 | 5.4 | 5.6 |
| Case of S Element Content of 6000 μmol/g * | | | | | | |
| Low Temperature High Rate Discharge Duration Time (s) | 135 | 162 | 177 | 181 | 184 | 194 |
| Discharge Duration Time at 0.2 CA (h) | 4.4 | 4.7 | 4.9 | 5.1 | 5.2 | 5.3 |
| Case of S Element Content of 7000 μmol/g * | | | | | | |
| Low Temperature High Rate Discharge Duration Time (s) | 143 | 168 | 184 | 187 | 190 | 200 |
| Discharge Duration Time at 0.2 CA (h) | 3.3 | 3.6 | 3.8 | 3.9 | 4.0 | 4.3 |

Figure 4:
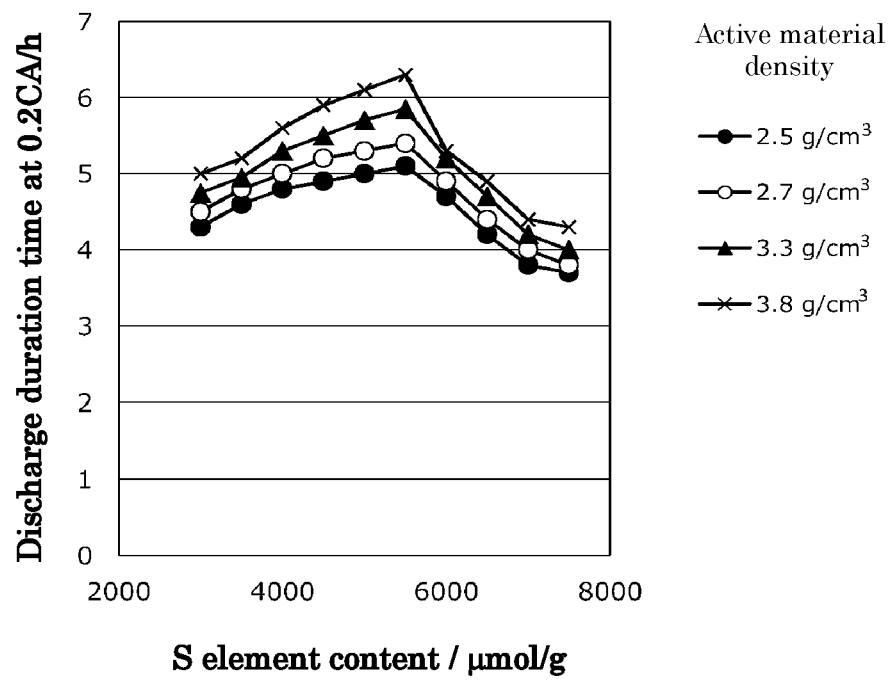
FIG. 4 is a characteristic graph showing a relation between the S element content in the organic expander and a discharge duration time at 0.2 CA.
Figure 5:
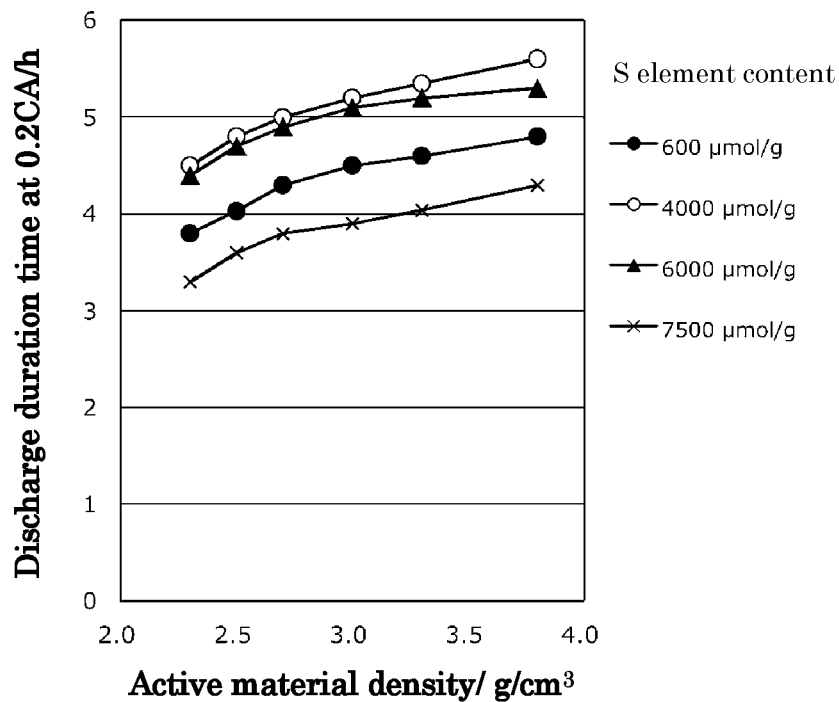
FIG. 5 is a characteristic graph showing a relation between the negative active material density and the discharge duration time at 0.2 CA.
Figure 6:
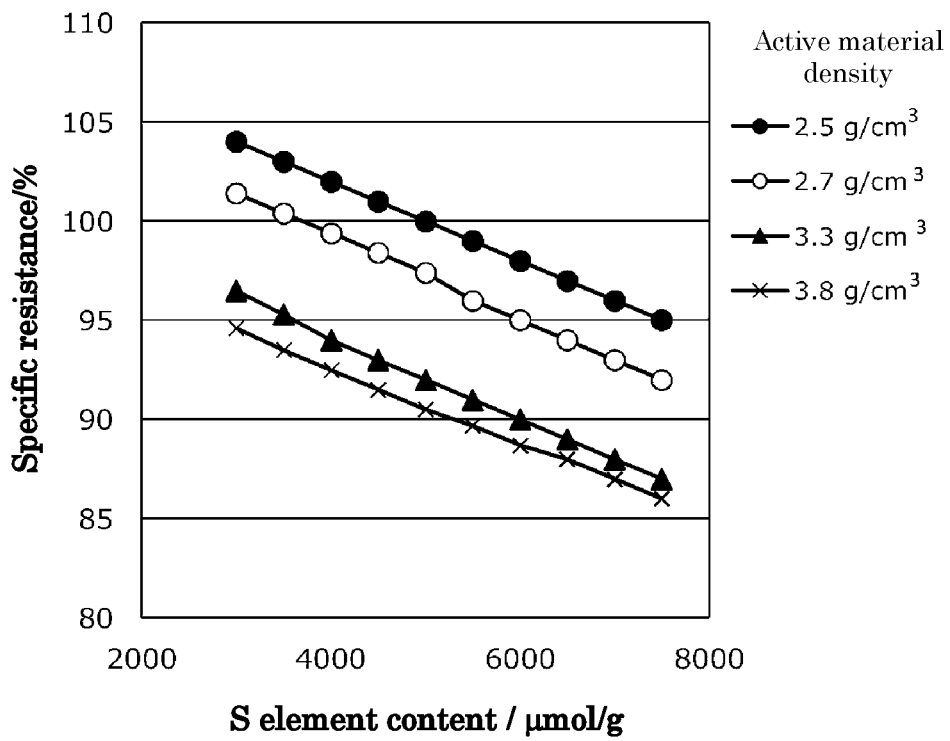
FIG. 6 is a characteristic graph showing a relation between the S element content in the organic expander and a specific resistance of the negative active material.

* The samples having an S element content of 600 μmol/g are samples of a comparative example in which an organic expander is made of lignosulfonic acid The discharge duration time at 0.2 CA was increased in the whole range from 2.3 g/cm³ to 3.8 g/cm³ with an increase of the density of the negative active material, increased in the range of the S element content of 4000 μmol/g or more and 6000 μmol/g or less, and decreased adversely over 6000 μmol/g (FIG. 4, FIG. 5).

Figure 7:
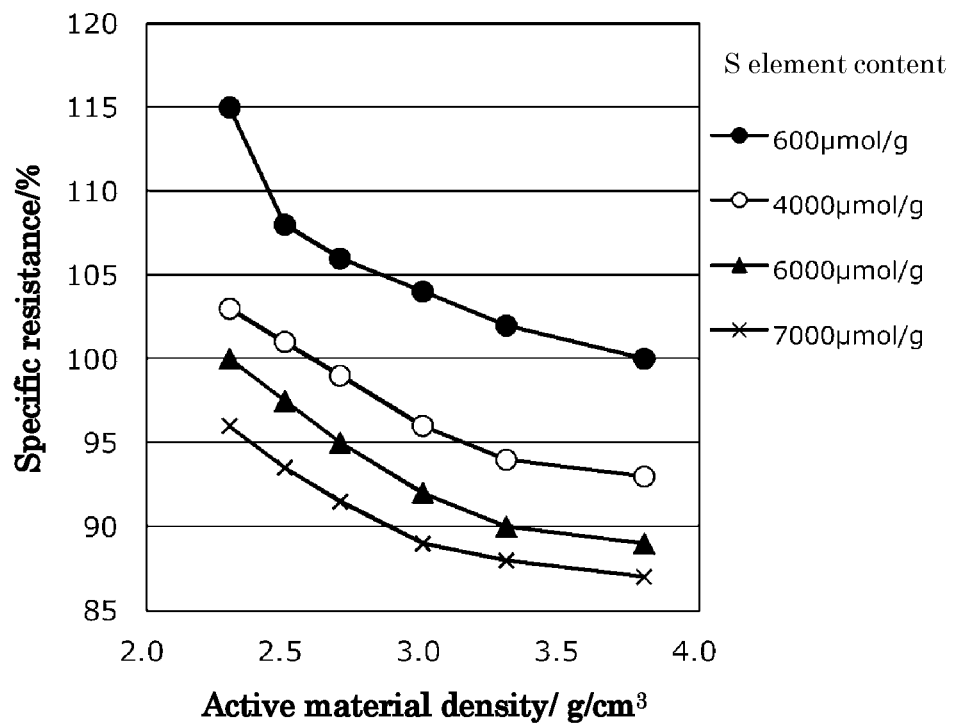
FIG. 7 is a characteristic graph showing a relation between the negative active material density and the specific resistance of the negative active material.

The specific resistance of the negative active material was decreased with an increase of the S element content (Table 5, FIG. 6), and was decreased in the whole range from 2.3 g/cm³ to 3.8 g/cm³ with an increase of the density of the negative active material (Table 6, FIG. 7).

TABLE 5

Active Material Density/S element content and Specific Resistance/Initial Performance/Lead Sulfate Accumulation Amount

| S Element Content (μmol/g) | 600*1 | 3000 | 3500 | 4000 | 4500 | 5000 | 5500 | 6000 | 6500 | 7000 | 7500 |
|---|---|---|---|---|---|---|---|---|---|---|---|
| Case of Active Material Density of 2.5 g/cm³ | | | | | | | | | | | |
| Specific Resistance | 108% | 104% | 103% | 102% | 101% | 100% | 99% | 98% | 97% | 96% | 95% |
| Low Temperature High Rate Discharge Performance | 85% | 87% | 88% | 92% | 96% | 100% | 103% | 106% | 108% | 110% | 112% |
| Charge Acceptance Performance | 65% | 75% | 82% | 87% | 91% | 93% | 94% | 96% | 98% | 99% | 100% |
| Lead Sulfate Accumulation Amount on Lower Portion*2 | 63% | 60% | 57% | 55% | 53% | 52% | 51% | 50% | 49% | 48% | 47% |
| Case of Active Material Density of 2.7 g/cm³ | | | | | | | | | | | |
| Specific Resistance | 106% | 101% | 100% | 99% | 98% | 97% | 96% | 95% | 94% | 93% | 92% |
| Low Temperature High Rate Discharge Performance | 90% | 92% | 95% | 101% | 105% | 109% | 112% | 116% | 118% | 120% | 121% |
| Charge Acceptance Performance | 76% | 90% | 98% | 105% | 114% | 120% | 124% | 130% | 134% | 137% | 140% |
| Lead Sulfate Accumulation Amount on Lower Portion*2 | 58% | 55% | 51% | 49% | 46% | 45% | 43% | 42% | 40% | 39% | 38% |
| Case of Active Material Density of 3.3 g/cm³ | | | | | | | | | | | |
| Specific Resistance | 102% | 97% | 95% | 94% | 93% | 92% | 91% | 90% | 89% | 88% | 87% |
| Low Temperature High Rate Discharge Performance | 93% | 96% | 100% | 105% | 109% | 114% | 118% | 120% | 123% | 124% | 125% |
| Charge Acceptance Performance | 87% | 105% | 115% | 128% | 140% | 148% | 153% | 158% | 163% | 167% | 170% |
| Lead Sulfate Accumulation Amount on Lower Portion*2 | 50% | 49% | 45% | 42% | 40% | 37% | 36% | 33% | 32% | 30% | 28% |
| Case of Active Material Density of 3.8 g/cm³ | | | | | | | | | | | |
| Specific Resistance | 100% | 95% | 94% | 93% | 92% | 91% | 90% | 89% | 88% | 87% | 86% |
| Low Temperature High Rate Discharge Performance | 100% | 103% | 106% | 111% | 116% | 121% | 125% | 127% | 130% | 131% | 132% |
| Charge Acceptance Performance | 100% | 120% | 132% | 145% | 156% | 165% | 172% | 180% | 183% | 186% | 190% |
| Lead Sulfate Accumulation Amount on Lower Portion*2 | 48% | 45% | 40% | 37% | 34% | 32% | 31% | 30% | 28% | 26% | 25% |

*1 The samples having an S element content of 600 μmol/g are samples of a comparative example in which an organic expander is made of lignosulfonic acid
*2 The lead sulfate accumulation amount is a value at the time of reaching an end of life

TABLE 6

Active Material Density and Specific Resistance/Initial Performance/Lead Sulfate Accumulation Amount

| Active Material Density (g/cm³) | 2.3 | 2.5 | 2.7 | 3.0 | 3.3 | 3.8 |
|---|---|---|---|---|---|---|
| Case of S Element Content of 600 μmol/g | | | | | | |
| Specific Resistance | 115% | 108% | 106% | 104% | 102% | 100% |
| Low Temperature High Rate Discharge Performance | 69% | 85% | 90% | 92% | 93% | 100% |
| Charge Acceptance Performance | 20% | 60% | 76% | 83% | 87% | 100% |
| Lead Sulfate Accumulation Amount on Lower Portion *² | 80% | 63% | 58% | 53% | 50% | 48% |
| Case of S Element Content of 4000 μmol/g | | | | | | |
| Specific Resistance | 103% | 101% | 99% | 96% | 94% | 93% |
| Low Temperature High Rate Discharge Performance | 78% | 92% | 101% | 103% | 105% | 111% |
| Charge Acceptance Performance | 70% | 87% | 105% | 120% | 128% | 145% |
| Lead Sulfate Accumulation Amount on Lower Portion *² | 59% | 54% | 49% | 44% | 42% | 37% |
| Case of S Element Content of 6000 μmol/g | | | | | | |
| Specific Resistance | 100% | 98% | 95% | 92% | 90% | 89% |
| Low Temperature High Rate Discharge Performance | 88% | 106% | 116% | 118% | 120% | 127% |
| Charge Acceptance Performance | 88% | 105% | 130% | 148% | 158% | 180% |
| Lead Sulfate Accumulation Amount on Lower Portion *² | 52% | 48% | 42% | 35% | 33% | 30% |
| Case of S Element Content of 7000 μmol/g | | | | | | |
| Specific Resistance | 96% | 94% | 92% | 89% | 88% | 87% |
| Low Temperature High Rate Discharge Performance | 93% | 110% | 120% | 122% | 124% | 131% |
| Charge Acceptance Performance | 98% | 115% | 137% | 154% | 167% | 186% |
| Lead Sulfate Accumulation Amount on Lower Portion *² | 48% | 44% | 39% | 33% | 30% | 26% |

Figure 8:
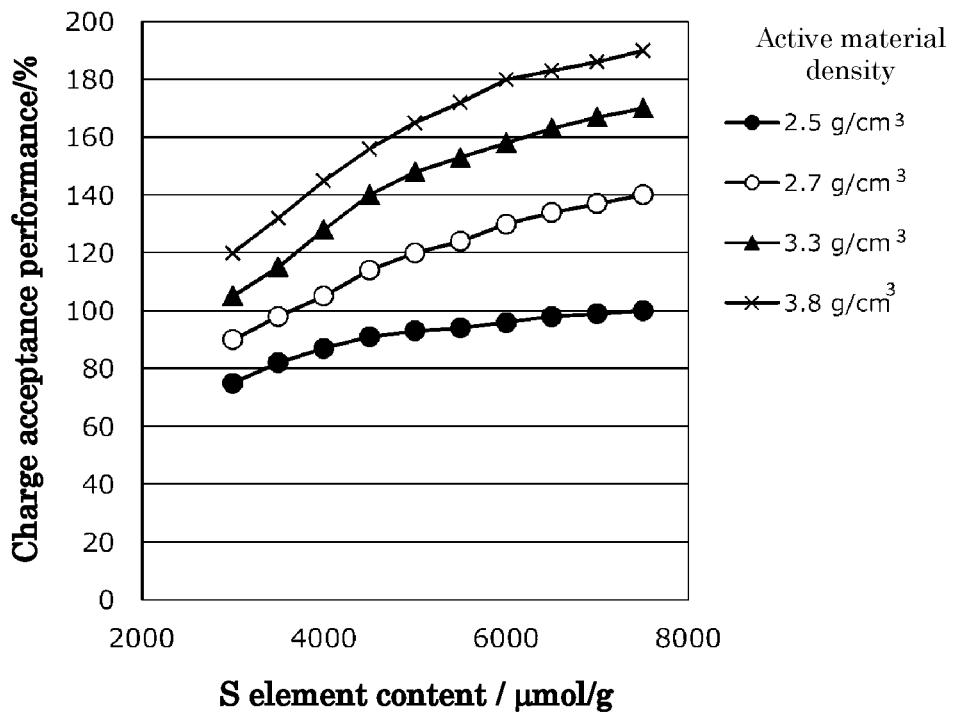
FIG. 8 is a characteristic graph showing a relation between the S element content in the organic expander and charge acceptance performance.
Figure 9:
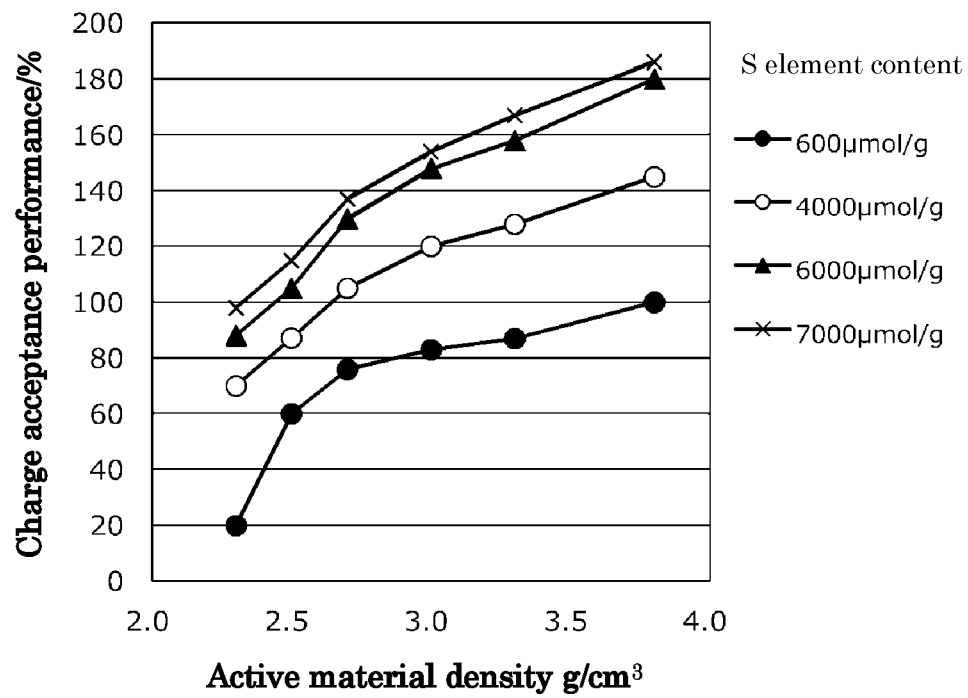
FIG. 9 is a characteristic graph showing a relation between the negative active material density and the charge acceptance performance.

*¹ The samples having an S element content of 600 μmol/g are samples of a comparative example in which an organic expander is made of lignosulfonic acid
*² The lead sulfate accumulation amount is a value at the time of reaching an end of life The charge acceptance performance was improved, and the accumulation amount of lead sulfate on a lower portion of the negative electrode plate was lowered as the specific resistance decreases. In the case where the density of the negative active material was 2.5 g/cm³, the effect of the S element on the charge acceptance performance was small. In the case where the S element content was 3000 μmol/g, the effect of the density of the negative active material on the charge acceptance performance was small. However, in the case where the density of the negative active material was 2.7 g/cm³ or more, the effect of the S element on the charge acceptance performance was increased, and the effect of the S element was further increased at the density of 3.0 g/cm³ or more (FIG. 9). Further, in the case where the S element content was 3900 μmol/g or more, particularly 4300 mol/g or more, the effect of the density of the negative active material on the charge acceptance performance was increased (FIG. 8). In the case where the S element content was 3900 μmol/g or more, preferably 4300 μmol/g or more and the density of the negative electrode material was 2.7 g/cm³ or more, preferably 3.0 g/cm³ or more, the charge acceptance performance was particularly improved (FIG. 8, FIG. 9).

It is found from FIG. 8, and FIG. 9 that the present inventor succeeded in maintaining the charge acceptance performance above a conventional level with a reduction of a lead amount which was desired to be solved for many years, as described in problems to be solved. This means that a battery adapted to the practical use can be realized.

Figure 10:
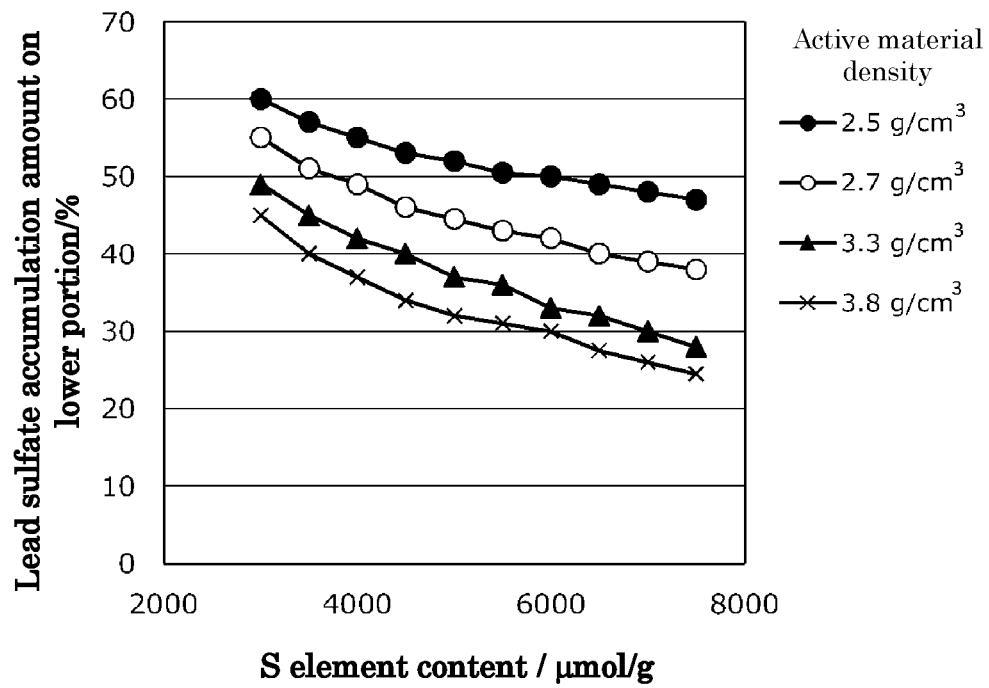
FIG. 10 is a characteristic graph showing a relation between the S element content in the organic expander and the lead sulfate accumulation amount on a lower portion.
Figure 11:
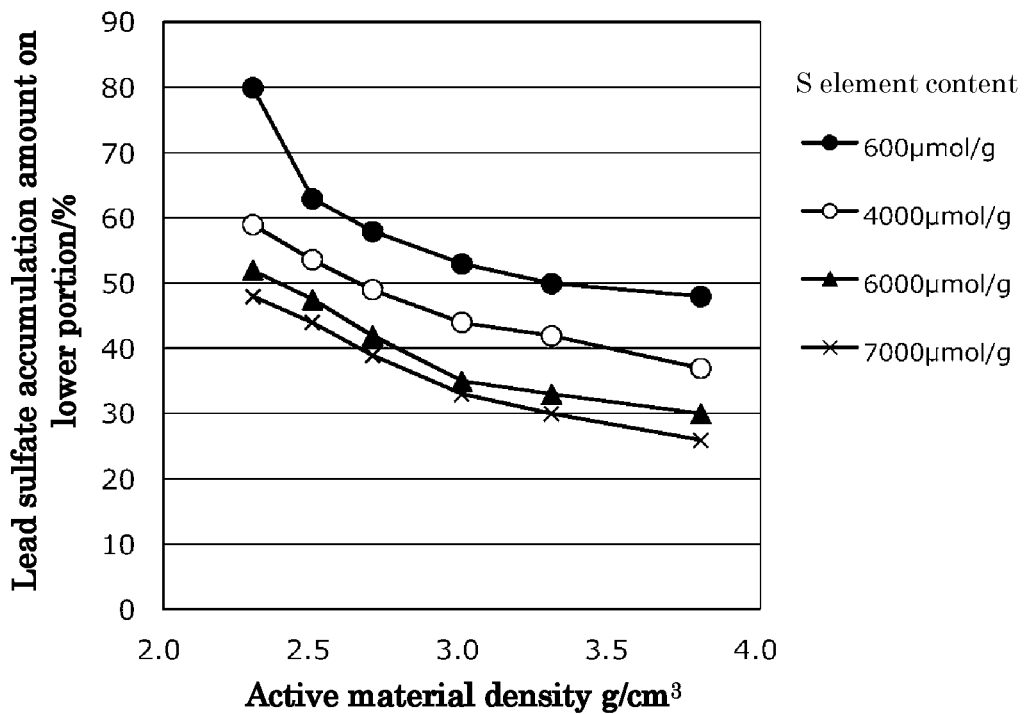
FIG. 11 is a characteristic graph showing a relation between the negative active material density and the lead sulfate accumulation amount on a lower portion.

The accumulation amount of lead sulfate on a lower portion of the negative electrode plate was decreased with an increase of the S element content, and also decreased with an increase of the density of the negative active material (Table 5, Table 6, FIG. 10, and FIG. 11). When the density of the negative active material was increased from 2.5 g/cm³ to 2.7 g/cm³, and further increased to 3.0 g/cm³, the effect of the S element on prevention of the lead sulfate accumulation was enhanced (FIG. 10, FIG. 11). In the comparison between the S element concentration of 4000 μmol/g and the S element concentration of 4500 μmol/g, the effect of the S element on suppression of the lead sulfate accumulation of the S element concentration of 4500 μmol/g was higher than that of the S element concentration of 4000 μmol/g (FIG. 10, FIG. 11).

When the S element concentration in the organic expander was 4500 μmol/g and the density of the negative active material was 3.8 g/cm³, but not shown in a drawing or a table, the accumulation amount of lead sulfate on a lower portion of the negative electrode plate was 36%, and 36.5% when the density was 3.7 g/cm³.

Experiment 2

Batteries were prepared in the same manner as in Experiment 1 except that the S element content in the organic expander was 600 μmol/g, the content of the organic expander was 0.1 mass %, and the carbon content was varied in three stages of 0 mass %, 0.2 mass % and 3.0 mass %. Batteries were prepared in the same manner as in Experiment 1 except that the S element content in the organic expander was 6000 μmol/g and the content of the organic expander was 0.1 mass %, and the carbon content was 0.2 mass %, and these batteries were evaluated in the same manner as in Experiment 1. These results are shown in Table 7, Table 8, and FIGS. 12 to 16.

TABLE 7

Density of Negative Active Material and Initial Performance

| Active Material Density (g/cm³) | 2.3 | 2.5 | 2.7 | 3.0 | 3.3 | 3.8 |
|---|---|---|---|---|---|---|
| Case of S Element Content of 600 μmol/g | | | | | | |
| Low Temperature High Rate Discharge Duration Time (s) | 105 | 130 | 138 | 141 | 142 | 153 |
| Discharge Duration Time at 0.2 CA (h) | 3.8 | 4.0 | 4.3 | 4.5 | 4.6 | 4.8 |
| **Case of S Element Content of 600 μmol/g* and No Carbon Addition** | | | | | | |
| Low Temperature High Rate Discharge Duration Time (s) | 100 | 125 | 132 | 138 | 140 | 150 |
| Discharge Duration Time at 0.2 CA (h) | 3.7 | 4.0 | 4.1 | 4.4 | 4.5 | 4.7 |
| **Case of S Element Content of 600 μmol/g* and Carbon Addition of 3.0%** | | | | | | |
| Low Temperature High Rate Discharge Duration Time (s) | 110 | 135 | 140 | 148 | — | — |
| Discharge Duration Time at 0.2 CA (h) | 2.8 | 3.0 | 3.2 | 3.3 | — | — |
| Case of S Element Content of 6000 μmol/g | | | | | | |
| Low Temperature High Rate Discharge Duration Time (s) | 135 | 162 | 177 | 181 | 184 | 194 |
| Discharge Duration Time at 0.2 CA (h) | 4.4 | 4.7 | 4.9 | 5.1 | 5.2 | 5.3 |

*The samples having an S element content of 800 μmol/g are samples of a comparative example in which an organic expander is made of lignosulfonic acid

TABLE 8

Active Material Density and Specific Resistance/Initial Performance/Lead Sulfate Accumulation Amount

| Active Material Density (g/cm³) | 2.3 | 2.5 | 2.7 | 3.0 | 3.3 | 3.8 |
|---|---|---|---|---|---|---|
| Case of S Element Content of 600 μmol/g | | | | | | |
| Specific Resistance | 115% | 108% | 106% | 104% | 102% | 100% |
| Charge Acceptance Performance | 20% | 60% | 76% | 83% | 87% | 100% |
| Lead Sulfate Accumulation Amount on Lower Portion *² | 80% | 63% | 58% | 53% | 50% | 48% |
| **Case of S Element Content of 600 μmol/g* and No Carbon Addition** | | | | | | |
| Specific Resistance | 121% | 110% | 108% | 105% | 102% | 101% |
| Charge Acceptance Performance | 15% | 45% | 55% | 65% | 70% | 80% |
| Lead Sulfate Accumulation Amount on Lower Portion *² | 75% | 68% | 60% | 55% | 56% | 50% |
| **Case of S Element Content of 600 μmol/g* and Carbon Addition of 3.0%** | | | | | | |
| Specific Resistance | 107% | 103% | 100% | 97% | 95% | 93% |
| Charge Acceptance Performance | 88% | 105% | 115% | 120% | 127% | 130% |
| Lead Sulfate Accumulation Amount on Lower Portion *² | 72% | 55% | 45% | 40% | 33% | 30% |
| Case of S Element Content of 6000 μmol/g | | | | | | |
| Specific Resistance | 100% | 98% | 95% | 92% | 90% | 89% |
| Low Temperature High Rate Discharge Performance | 88% | 106% | 116% | 118% | 120% | 127% |
| Charge Acceptance Performance | 88% | 105% | 130% | 148% | 158% | 180% |
| Lead Sulfate Accumulation Amount on Lower Portion *² | 52% | 48% | 42% | 35% | 33% | 30% |

Figure 15:
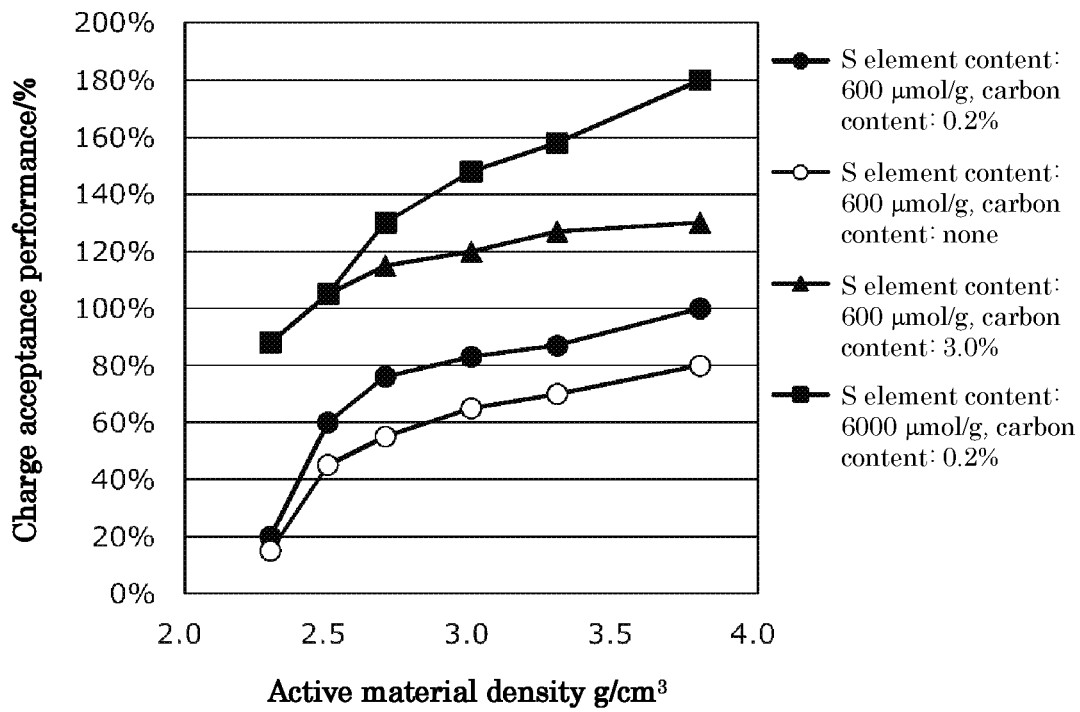
FIG. 15 is a characteristic graph showing a relation between the negative active material density and the charge acceptance performance.

*² The lead sulfate accumulation amount is a value at the time of reaching an end of life In the case where the S element content in the organic expander was 600 μmol/g, when the negative electrode material does not contain a carbon, the battery was lower in the charge acceptance performance than that of the battery containing 0.2 mass % of a carbon, and the charge acceptance performance was further improved when the carbon content was increased to 3.0 mass %. When the S element content in the organic expander was set to 6000 μmol/g and the negative electrode material contains 0.2 mass % of a carbon, the charge acceptance performance was markedly higher than that of the case where the S element content in the organic expander was 600 μmol/g, and the charge acceptance performance was high particularly even though the active material density was low. When the active material density was 2.5 g/cm³, the charge acceptance performance maintained a level of 105% if the S element content in the organic expander was 6000 µmol/g, and was higher than that of a conventional case where the S element content was 600 µmol/g and the density was 3.8 g/cm³. ((FIG. 15)

Figure 16:
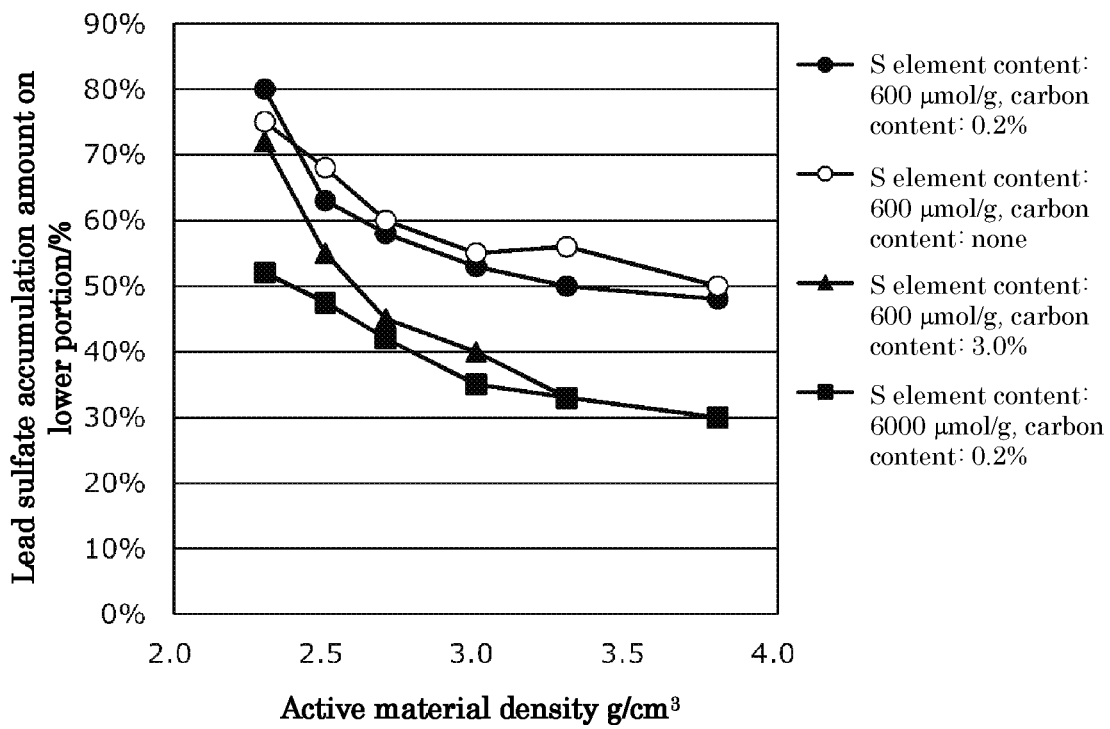
FIG. 16 is a characteristic graph showing a relation between the negative active material density and the lead sulfate accumulation amount on a lower portion.

The lead sulfate accumulation amount on a lower portion became the smaller, the larger the carbon content became in the case where the S element content in the organic expander was 600 µmol/g. When the S element content in the organic expander is changed from 600 µmol/g to 6000 µmol/g, the lead sulfate accumulation amount on a lower portion can be suppressed without containing a large amount of carbon. (FIG. 16)

In the case where the S element content in the organic expander was 600 µmol/g, the low temperature high rate discharge performance was improved by increasing the carbon content, but the rate of improvement by the carbon content was not so large. The low temperature high rate discharge performance can be largely improved by increasing the S element content in the organic expander from 600 µmol/g to 6000 µmol/g.

When the S element content in the organic expander was 600 µmol/g and the content of the organic expander was 0.2 mass %, the low temperature high rate discharge performance was 153 (S) at the active material density of 3.8/cm³, and when the S element content in the organic expander was 6000 µmol/g and the content of the organic expander was 0.2 mass %, the low temperature high rate discharge performance was 162 (S) even at the active material density of 2.5/cm³, and was larger than that at the active material density of 3.8/cm³ in the case of the S element content of 600 µmol/g.

Figure 12:
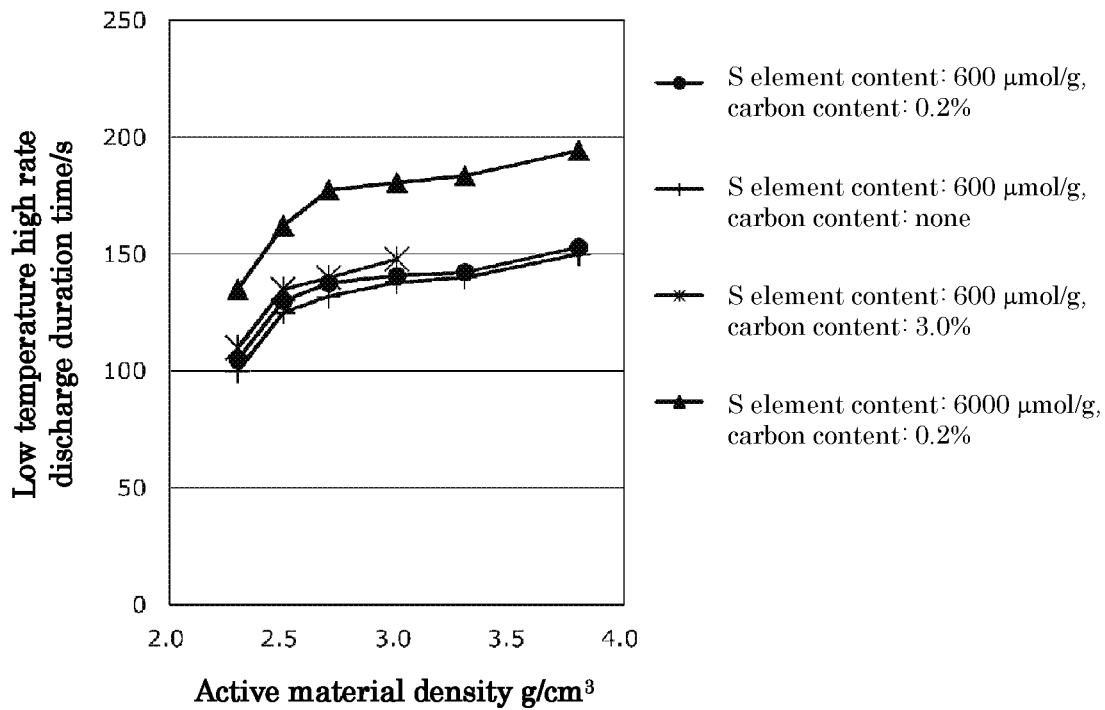
FIG. 12 is a characteristic graph showing a relation between a negative active material density and a low temperature high rate discharge duration time.

The result shows that the rate of improvement in the case of changing the S element content in the organic expander from 600 µmol/g to 6000 µmol/g is larger than that in the case of increasing the carbon content. (FIG. 12)

Figure 13:
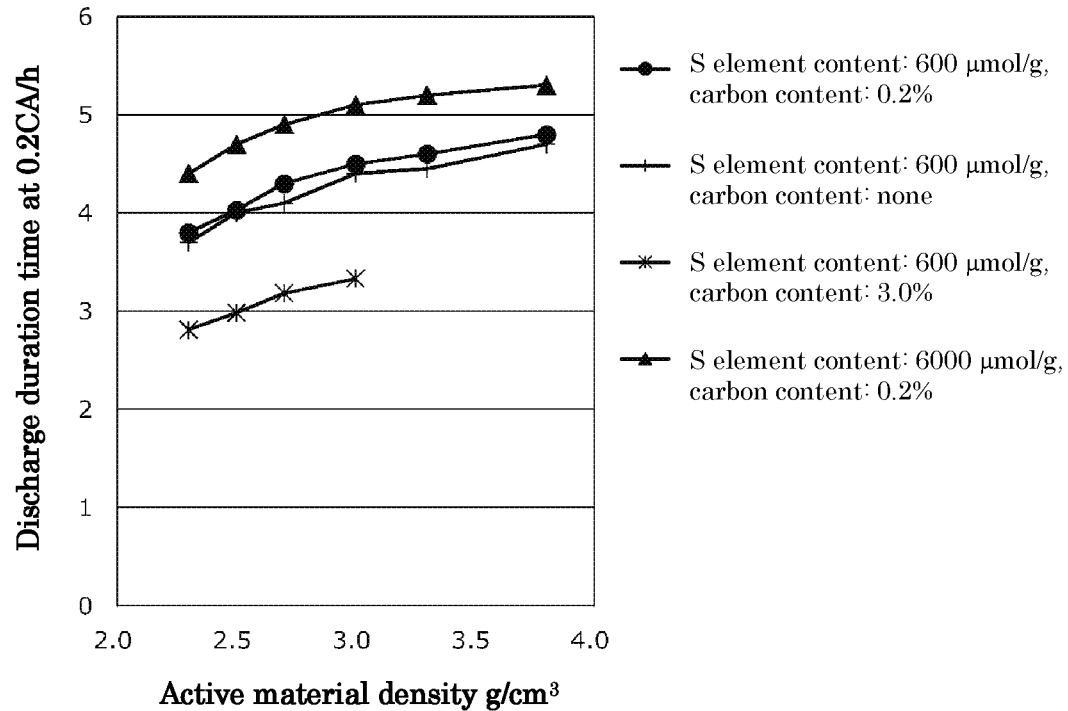
FIG. 13 is a characteristic graph showing a relation between the negative active material density and the discharge duration time at 0.2 CA.

In the case where the S element content in the organic expander was 600 µmol/g, the discharge duration time at 0.2 CA was increased by increasing the carbon content from 0 mass % to 0.2 mass %, but the discharge duration time was decreased by further increasing the carbon content to 3.0 mass %. By increasing the S element content in the organic expander from 600 µmol/g to 6000 µmol/g, the discharge duration time at 0.2 CA can be increased even though the carbon content is the same 0.2 mass % as in 600 µmol/g. (FIG. 13)

Figure 14:
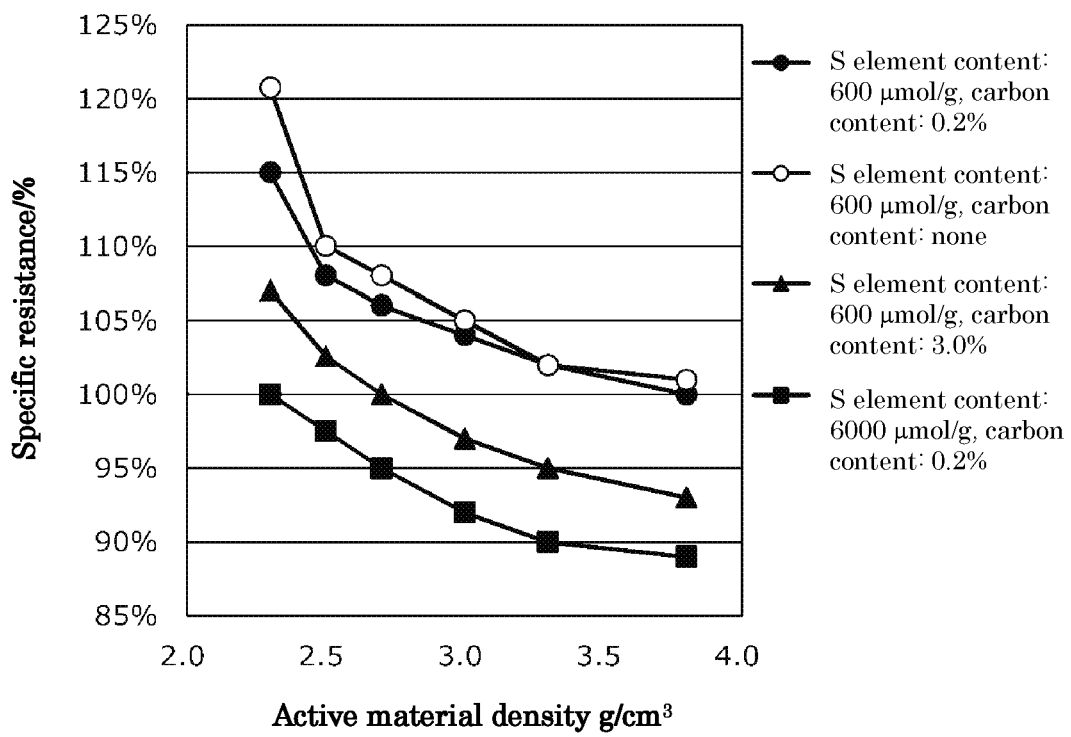
FIG. 14 is a characteristic graph showing a relation between the negative active material density and the specific resistance of the negative active material.

The specific resistance became the smaller, the larger the carbon content became in the case where the S element content in the organic expander was 600 µmol/g. When the S element content in the organic expander was change from 600 µmol/g to 6000 µmol/g, the specific resistance can be suppressed without containing a large amount of carbon. (FIG. 14)

The S element content of the organic expander (hereinafter, referred to as merely "S element content") in the negative active material and the density of the negative active material (negative electrode material) in EXAMPLES were measured by the methods described in the aforementioned measurement method.

The present invention can be performed in the following aspects.

1. A lead-acid battery comprising a negative electrode material, which has a density of 2.7 g/cm³ or more and 3.8 g/cm³ or less and contains an organic expander, and the organic expander has a sulfur element (S element) content of 3900 µmol/g or more. Thereby, charge acceptance performance was improved.

2. In the aspect 1, the lead-acid battery, wherein the S element content of the organic expander is 3900 µmol/g or more and 6000 µmol/g or less. According to this one aspect, it is preferred since a low rate discharge capacity can be maintained favorable.

3. In the lead-acid battery of the aspect 1, wherein the S element content of the organic expander is 4300 µmol/g or more. According to this one aspect, it is preferred since the effect of improving the charge acceptance performance is particularly large.

4. In the lead-acid battery of the aspect 1, wherein the S element content of the organic expander is 4300 µmol/g or more and 6000 µmol/g or less. According to this one aspect, it is preferred since the effect of improving the charge acceptance performance is particularly large and discharge duration performance at 0.2 CA can be increased.

5. In any one of the lead-acid battery of the aspects 1 to 4, wherein the organic expander is a synthetic polymer. According to this one aspect, it is preferred since the S element content can be easily set to 3900 µmol/g or more.

6. In the lead-acid battery of the aspect 5, wherein the organic expander is bisphenols condensate. According to this one aspect, it is preferred since starting performance at low temperature is not impaired even when undergoing a high-temperature environment and therefore the lead-acid battery is suitable for a flooded-type lead-acid battery for an automobile or the like.

7. In the lead-acid battery of the aspect 5 or 6, wherein the S element content of the organic expander is a total amount of a sulfonic acid group and a sulfonyl group. According to this one aspect, it is preferred since it is possible to suppress the growth of organic expander particles.

8. A lead-acid battery, wherein a negative electrode plate taken out from the lead-acid battery is washed with water to eliminate a sulfuric acid content, a negative electrode material is separated from the negative electrode plate whose sulfuric acid content is removed, the negative electrode material is immersed in a 1 mol/L sodium hydroxide aqueous solution, a solution obtained by removing, by filtration, a component which is insoluble in the aqueous solution is desalted, condensed, and dried to obtain a powder specimen and the S element content of the powder specimen is 3900 µmol/g or more, and the negative electrode material has a density of 2.7 g/cm³ or more and 3.8 g/cm³ or less. Thereby, charge acceptance performance was improved.

9. In the lead-acid battery of the aspect 8, wherein the S element content of the powder specimen is 3900 µmol/g or more and 6000 µmol/g or less. According to this one aspect, it is preferred since a low rate discharge capacity can be maintained favorable.

10. In the lead-acid battery of the aspect 8, wherein the S element content of the powder specimen is 4300 µmol/g or more. According to this one aspect, it is preferred since the effect of improving the charge acceptance performance is particularly large.

11. In the lead-acid battery of the aspect 8, wherein the S element content of the powder specimen is 4300 µmol/g or more and 6000 µmol/g or less. According to this one aspect, it is preferred since the effect of improving the charge acceptance performance is particularly large and discharge duration performance at 0.2 CA can be increased.

12. In any one of the lead-acid battery of the aspects 8 to 11, wherein the powder specimen is a synthetic polymer. According to this one aspect, it is preferred since the S element content can be easily set to 3900 µmol/g or more.

13. In the lead-acid battery of the aspect 12, wherein the powder specimen is bisphenols condensate. According to this one aspect, it is preferred since starting performance at low temperature is not impaired even when undergoing a high-temperature environment and therefore the lead-acid battery is suitable for a flooded-type lead-acid battery for an automobile or the like.

14. In the lead-acid battery of the aspect 12 or 13, wherein the S element content of the powder specimen is a total amount of the sulfonic acid group and the sulfonyl group. According to this one aspect, it is preferred since it is possible to suppress the growth of organic expander particles.

15. A method for manufacturing a lead-acid battery, wherein a negative electrode is prepared so that the negative electrode includes a negative electrode material, which has a density of 2.7 g/cm$^3$ or more and 3.8 g/cm$^3$ or less and contains an organic expander, and the organic expander has a sulfur element (S element) content of 3900 μmol/g or more. Thereby, charge acceptance performance was improved.

The invention claimed is:

1. A lead-acid battery comprising:
    a negative electrode material,
    wherein the negative electrode material has a density of 2.7 g/cm$^3$ or more and 3.8 g/cm$^3$ or less and contains an organic expander,
    the organic expander has a sulfur element (S element) content of 4300 μmol/g or more.

2. The lead-acid battery according to claim 1, wherein the S element content of the organic expander is 4300 μmol/g or more and 6000 μmol/g or less.

3. The lead-acid battery according to claim 1, wherein the organic expander is a synthetic polymer.

4. The lead-acid battery according to claim 3, wherein the organic expander is bisphenols condensate.

5. The lead-acid battery according to claim 3, wherein the S element content of the organic expander is a total amount of a sulfonic acid group and a sulfonyl group.

6. The lead-acid battery according to claim 1, further comprising a negative electrode plate containing the negative electrode material,
    wherein the sulfur element (S element) content is measured as a S element content in a powder specimen obtained by taking out the negative electrode plate from the lead-acid battery, washing the negative electrode plate with water to eliminate a sulfuric acid content, separating the negative electrode material from the negative electrode plate whose sulfuric acid content is removed, immersing the negative electrode material in a 1 mol/L sodium hydroxide aqueous solution, desalting a solution obtained by removing, by filtration, a component which is insoluble in the aqueous solution, and condensing and drying the desalted solution.

7. The lead-acid battery according to claim 6, wherein the powder specimen is a synthetic polymer.

8. The lead-acid battery according to claim 7, wherein the powder specimen is bisphenols condensate.

9. The lead-acid battery according to claim 7, wherein the S element content of the powder specimen is a total amount of a sulfonic acid group and a sulfonyl group.

10. A method for manufacturing a lead-acid battery, comprising:
    filling a negative electrode material in a current collector to prepare a negative electrode; and
    performing a formation of the negative electrode,
    wherein the negative electrode material in the negative electrode after performing the formation has a density of 2.7 g/cm$^3$ or more and 3.8 g/cm$^3$ or less and contains an organic expander, and
    the organic expander has a sulfur element (S element) content of 4300 μmol/g or more.

* * * * *